United States Patent

Persson

[15] 3,640,649
[45] Feb. 8, 1972

[54] SCREW ROTORS

[72] Inventor: Jan Edvard Persson, 2 Edinsvagen, Ektorp, Sweden

[22] Filed: Sept. 23, 1969

[21] Appl. No.: 860,257

[52] U.S. Cl. ............................................. 418/191, 418/201
[51] Int. Cl. ..................................... F03c 11/00, F03c 3/00
[58] Field of Search .......................................... 418/201, 191

[56] References Cited

UNITED STATES PATENTS

| 3,283,996 | 11/1966 | Schibbye | 418/201 |
| 3,414,189 | 12/1968 | Persson | 418/201 |

FOREIGN PATENTS OR APPLICATIONS

| 753,275 | 7/1956 | England | 418/201 |

*Primary Examiner*—Martin P. Schwadron
*Assistant Examiner*—Clemens Schimikowski
*Attorney*—Munson & Fiddler

[57] ABSTRACT

A gate screw rotor forming one part of a set of screw rotors for a screw rotor machine which has a helical sealing ridge at the intersection between a first concavely curved flank of a helical thread and an arcuate crest portion of the profile whereas the said crest portion merges in a second concavely curved flank of the thread with a rounded profile portion. The gate rotor is cut by means of a cutter having blades each one of which cut the entire profile of the threads from the leading side of said ridge through the bottom of the groove to the trailing side of the ridge. The main rotor of a screw rotor set for such a machine may be manufactured in similar way.

7 Claims, 4 Drawing Figures

PATENTED FEB 8 1972 3,640,649

JAN EDVARD PERSSON

INVENTOR.

BY MUNSON & FIDDLER,
Attorneys

SCREW ROTORS

The invention refers to screw rotor machines, which have cooperating helical threads and grooves, the threads of the gate rotor having substantially concavely curved flanks and being disposed substantially inside the pitch circle of the gate rotor threads whereas the main rotor threads have substantially convexly curved flanks and are disposed substantially outside the pitch circle of the main rotor threads. The rotors are rotatable in bores in a housing communicating with inlet and outlet passages through suitable ports. Screw rotors for screw rotor machines of this type have so far always been cut in a number of operations by means of cutters which have been used to cut various portions of the profile of each screw rotor thread. This is an expensive way of manufacturing screw rotors and makes it difficult to produce the rotor threads with the desired accuracy. One object of the invention is to provide a screw rotor having a profile of its thread which permits cutting of the leading and trailing flanks of the thread and the bottom of the groove as well as the top of the crest of the thread by means of a cutter having cutter blades each one of which cuts all these parts of the profile. A further object of the invention is to provide a profile which may be cut in a single operation by cutters the cutter blades of which may be resharpened without change of the rotor thread profiles. Screw rotors for screw rotor machines according to the invention and cutter blades for manufacturing such screw rotors are illustrated on the accompanying drawings by way of example but it should be understood that modifications may be made in various ways within the scope of the claims.

In the accompanying drawings

Figure 1:
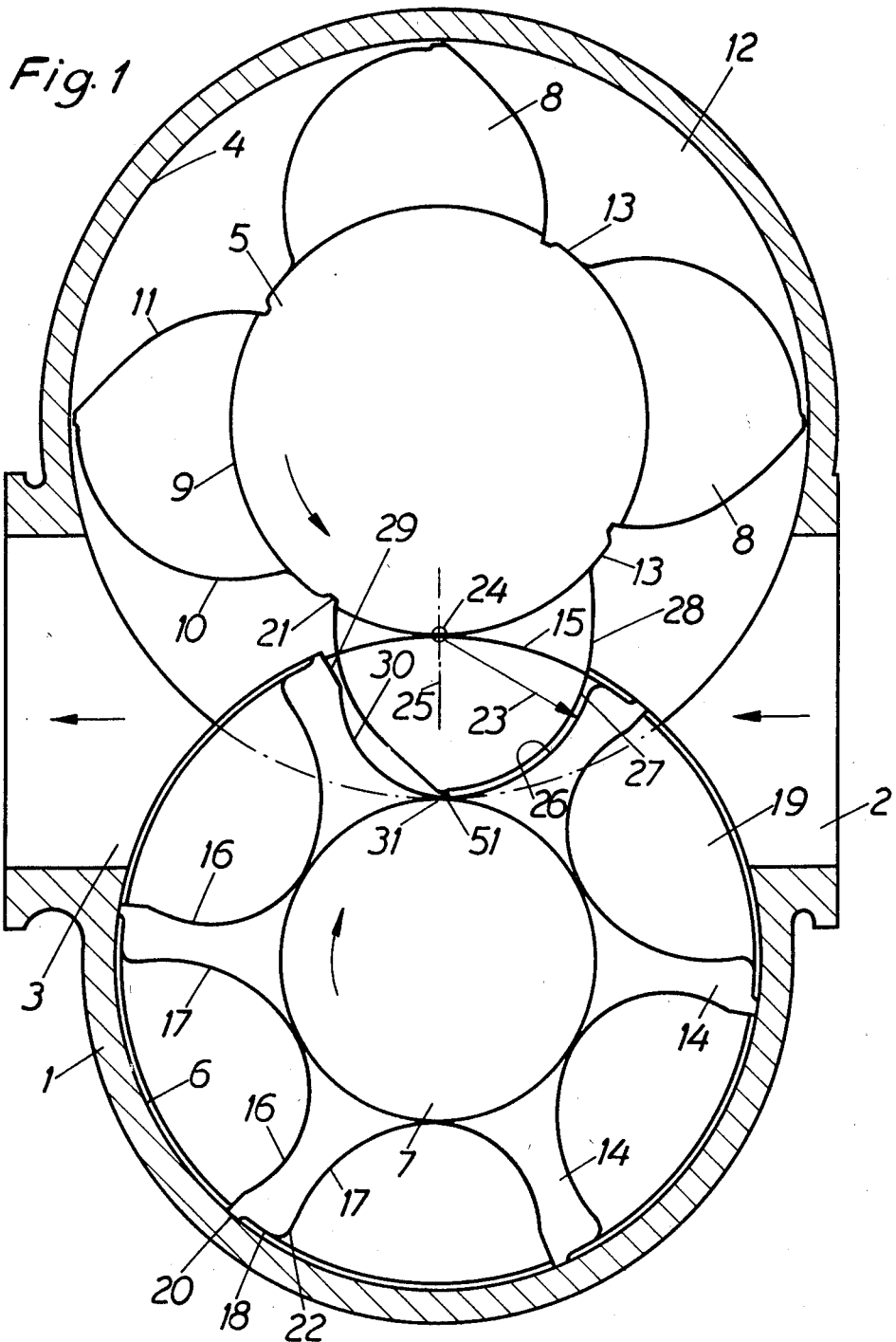
FIG. 1 is a cross section of a screw compressor the hatching of the rotors having been omitted for better visibility.

The screw compressor in FIG. 1 comprises a housing 1 provided with inlet and outlet ports 2 and 3 and having a bore 4 in which a main rotor 5 is mounted for rotation. The housing 1 is furthermore provided with a bore 6 in which a gate rotor 7 is mounted for rotation. The main rotor 5 is provided with helical threads 8 disposed substantially outside the pitch circle 9 of the main rotor and having convexly shaped first and second flanks which in the illustrated compressor are the leading and trailing flanks 10 and 11, respectively, defining between them helical grooves 12 the bottom portion of which is defined by an arcuate portion 13 of the main rotor profile situated substantially on the pitch circle of the main rotor thread. The gate rotor 7 which cooperates with the main rotor is provided with helical threads 14 which are situated substantially inside the pitch circle 15 of the gate rotor. The gate rotor threads are provided with substantially concave first and second flanks which are the leading and trailing flanks 16 and 17, respectively. The crests of the gate rotor threads are defined by arcuate portions 18. The main and gate rotors cooperate to form with each other and with the walls of the bores in the housing 1 travelling pockets the volumes of which decrease as the pockets move towards the outlet ports, as is conventional in screw compressors. At the intersection between the arcuate crest portions 18 and the concavely shaped leading flanks 16 of the gate rotor threads helical sealing ridges 20 are formed. The helical sealing ridges 20 on the gate rotor threads cooperate with mating helical grooves 21 at the bottom of the main rotor threads. Said mating grooves 21 are disposed at the intersection between the trailing flank 11 of the main rotor threads and the groove bottom portion 13. The portion between the helical sealing ridge 20 and the trailing gate rotor thread flank 17 is a smooth cylindrical surface which merges in the flank portion 17 through a soft convex portion 22. The flank 17 has a profile of a circular arc produced by a radius vector 23 which has its center or which is swung on a point 24. Said point is in the intersection between a radius 25 through the innermost point 31 of the gate rotor groove and the pitch circle 15 of the gate rotor. The portion of the leading flank 10 of the main rotor which cooperates with the gate rotor flank 17 has also a profile formed as a circular arc with its center in the point 24. The circular portion 26 of the trailing gate rotor flank is therefor substantially congruent with the circular portion 27 of the leading main rotor thread flank.

The root portion 28 of the leading main rotor flank 10 is generated by the convex rounded portion 22 of the trailing gate rotor thread flank. The portion 13 forming the bottom of the main rotor groove is a circular arc which cooperates with the circular arc portion 18 at the gate rotor thread crest. The ridge 20 of the gate rotor generates the mating groove 21 in the main rotor. The trailing flank 1 of the main rotor thread is generated by a substantially straight portion 29 adjacent the crest of the leading gate rotor thread flank 16. The main portion of the flank 16 between said straight portion 29 and the innermost point 31 of the gate rotor groove is formed by a concavely curved profile portion 30 which is generated by the tip 51 of the main rotor thread.

Figure 2:
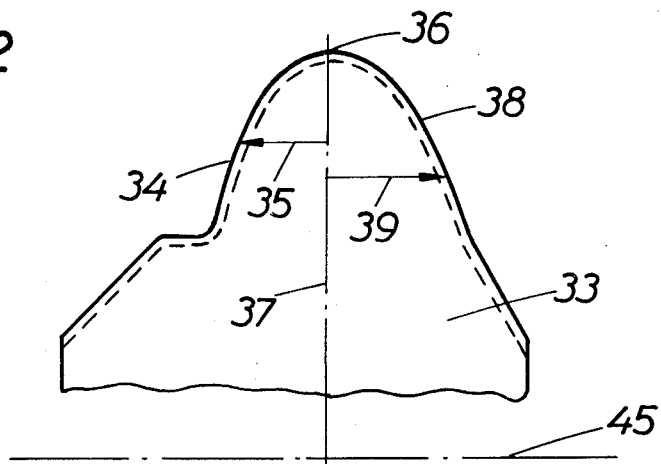
FIG. 2 is a partial profile of a gate rotor cutter blade.
Figure 4:
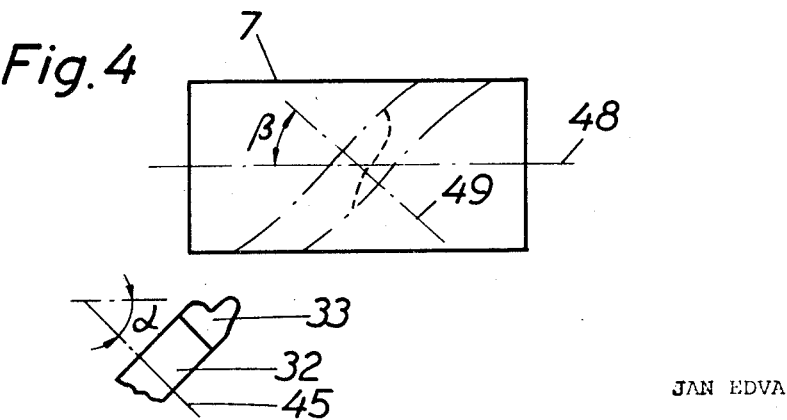
FIG. 4 is a diagrammatic plan view of a gate rotor and cutter therefore.

The helical threads of the gate rotor 7 illustrated in FIG. 1 and in plan view in FIG. 4 are cut in a single operation by means of a cutter 32, FIG. 4, which cutter has blades 33 which are shaped so that they cut the flanks 16 and 17 as well as the crest 18 of the gate rotor thread. The cutter blades, FIG. 2, are formed so that they can be resharpened without changing the profile. The portion 34 of the blade profile is therefore generated by a vector parallel with the cutter axis 45, which extends from a line 37 intersecting the axis 45 and increasing in length as it moves from the tip 36 towards the cutter axis 45. The line 37 indicates a plane intersecting the cutter axis 45. Similarly the blade portion 38 is generated by a vector 39 parallel with the axis 45 which increases in length as it moves parallel to itself from the tip 36 towards the cutter axis 45 over the effective portion of the cutter blade. The dotted line inside the blade profile indicates the profile obtained after regrinding of the blade.

Figure 3:
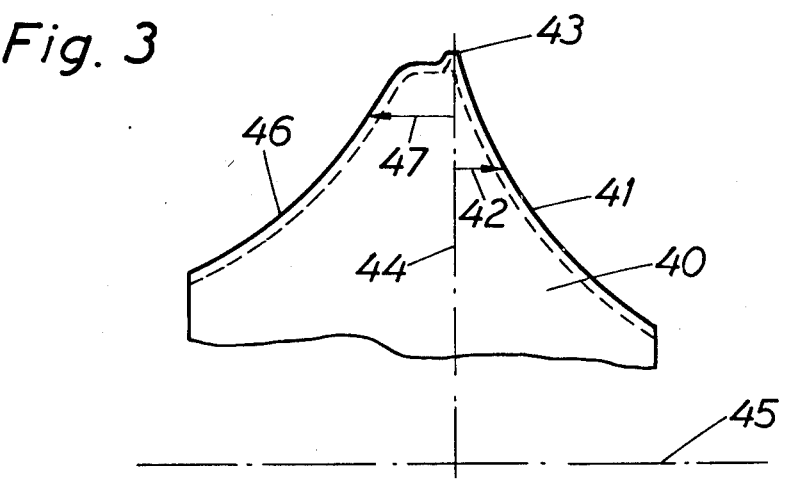
FIG. 3 is a partial profile of a main rotor cutter blade.

The cutter used for forming the main rotor consists of cutter blades 40 in which the blade portion 41 has a profile which is produced by a vector 42 which increases in length as it moves parallel to itself from the tip 43 along a plane 44 intersecting the cutter axis 45 towards the cutter axis. Similarly the profile 46 of the cutter blade 40 is produced by a vector 47 parallel with the axis 45 which increases in length as it moves parallel to itself and extends from the plane 44 from the point 43 towards the cutter axis 45 over the whole effective portion of the cutter blade. In FIG. 3 the new profile which is provided after regrinding of a cutter blade 40 is indicated in dotted lines which shows that the cutter blades can be reground a number of times without changing the profile.

The cutter blades 33 and 40 are shaped in such a manner that cutting may be made with a cutter which rotates on an axis 45 which forms an angle $\alpha°$ with the respective rotor axis 48 which is less than an angle $\alpha°$ between a line 49 which is perpendicular to a plane forming the lead angle of the crest helix of the rotor thread with the rotor axis 48. A reduced angle $\alpha$ results in a narrow blade 33 or 40, respectively, and more suitable shape of the cuttings and of the surface finish of the rotors.

The invention above described should only be considered as an example and may be modified in several different ways within the scope of the following claims. The invention may, for instance, be applied to screw rotors of screw rotor motors.

I claim:

1. A gate screw rotor forming one part of a set of screw rotors for a screw rotor machine and having helical threads and grooves lying substantially inside the pitch circle of said threads, which have concavely curved profiles on first and second flanks of each thread and a circular arc defining the main portion of the profile of the crest of the thread, characterized in that a helical sealing ridge is provided at the intersection between said first concavely curved flank and said circular arc defining a sharp helical edge at the crest of said first flange, whereas the rest of said arc is smooth and merges into said second concavely curved flank of said thread with a rounded convex portion.

2. A gate screw rotor according to claim 1, in the combination of a circular arc forming a major portion of said flank and having its center of radius on the intersection of the pitch circle of the gate rotor thread and a radius through the radially innermost point of the gate groove and said rounded convex portion, which merges into said main portion of said crest.

3. A gate screw rotor according to claim 1, in which a portion of the first flank profile from the pitch circle towards the rotor center is a straight line.

4. A gate screw rotor according to claim 3, in which said straight line portion forms a blunt angle with an adjacent portion inside said straight line portion.

5. A gate screw rotor according to claim 1, in which the concavely curved second flank profile portion in a circular arc having its center of radius on the intersection of the pitch circle of the gate rotor and a radius through a radially innermost point of the gate rotor groove, said circular arc extending substantially from said rounded convex portion at the pitch circle to said radially innermost point and merging directly into said concavely curved first gate door flank profile portion, which is generated by a crest point of a cooperating main rotor thread, at the bottom of the gate rotor groove.

6. A gate screw rotor according to claim 1 for a screw compressor, in which said first flank is the leading flank and said second flank the trailing flank of the gate rotor thread.

7. A main screw rotor shaped for sealing cooperation with a gate screw rotor having helical threads and grooves lying substantially outside the pitch circle of said threads, which have convex first and second thread flank profiles and a helical sealing groove at the intersection between the second thread flank and said pitch circle, the bottom of said sealing groove forming the radially innermost portion of main rotor threads and grooves.

* * * * *